Patented Apr. 28, 1942

2,280,814

UNITED STATES PATENT OFFICE 2,280,814

ETHERS OF DUROHYDROQUINONE AND PROCESS OF PREPARING SAME

Erhard Fernholz, Princeton, N. J., assignor to Merck & Co. Inc., Rahway, N. J., a corporation of New Jersey No Drawing. Application June 2, 1938, Serial No. 211,393. In Germany June 3, 1937

9 Claims. (Cl. 260—613)

This invention relates to certain new and useful ethers derived from durohydroquinone (I)

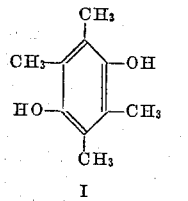 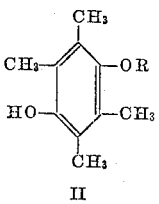 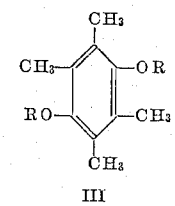
    I                  II                III which are generally characterized by the Formulas II and III wherein R is a member selected from the group consisting of an alkyl radical, an alkenyl radical, and a hydroaromatic radical, and processes for their production.

The mono-ethers of the above type may be prepared in various ways, for example by reacting durohydroquinone with an alkyl halide, an alkenyl halide, or a hydroaromatic radical halide, preferably in an alkaline solution such as an alcoholic alkaline or an acetonic alkaline solution. The esters of the alcohols, for example, the toluene sulfonates, can be likewise reacted with durohydroquinone to form the desired ethers. Also, the direct condensation of the alcohol with durohydroquinone may be effected in the presence of acids.

Similar ethers of dihydric phenol have hitherto been prepared. For example, U. S. Patent No. 1,883,952 relates to such mono-ethers of hydroquinone. However, the different nature of durohydroquinone in which the phenolic chemical properties are weak or even absent, have been found to require modifications in the process for the production of its alkyl ethers.

The mono-ethers of durohydroquinone which are disclosed in the instant application also have some new and unexpected properties. The solubility in alkali which the mono-ethers of hydroquinone possess is absent in the durohydroquinone mono-ethers. It is, therefore, not possible to use the conventional methods which have hitherto been employed for the isolation of the mono-ethers of polyhydric phenols which depend for their effectiveness upon the acid properties of such ethers.

The mono-ethers of durohydroquinone herein disclosed, on the other hand, are neutral substances, insoluble in alkali. They are crystalline compounds, soluble in common organic solvents, and can readily be distilled under a high vacuum.

It has been found by the applicant that he could utilize and conveniently adapt these properties to his method of producing the new series of compounds herein described.

It has been found that the new mono-ethers of the instant application are also chemically characterized by a high reducing power. For instance, silver nitrate is reduced to metallic silver in alcoholic solution on gentle heating. They are also relatively non-toxic. Possessing as they do, a marked anti-oxidant action and, being soluble in lipoids, they may be advantageously employed for the stabilization of fats and other similar organic material against oxidation.

These synthetic mono-ethers of the higher alcohols are structurally closely related to natural tocopherol, and are believed to possess in varying degree the physiological activities thereof. They should, therefore, also find useful adaptation in appropriate forms of pharmaceutical preparations.

The di-ethers, which are concomitantly produced in the processes herein described for the production of the mono-ethers, are also serviceable as intermediates for ultimate conversion to the corresponding mono-ethers by appropriate processes as will further appear.

The examples given below deal with the preparation of ethers of higher alcohols, and are presented as preferred methods, by way of illustration, and not of limitation. It will be readily obvious, to those skilled in the art that other variations in relative quantities and materials may be made without departing from the scope and spirit of the invention.

EXAMPLES

1. Durohydroquinone octadecyl ethers

A suspension of 8.3 g. of durohydroquinone and 24 g. of octadecyl iodide in 50 cc. of alcohol is refluxed on the steam bath in a slow stream of hydrogen and with thorough stirring. To this mixture is then added in small drops and within 15 minutes 55 cc. of alcoholic N—KOH. The refluxing is continued for several hours. Four liters of alcohol are then added and the mixture boiled for about an hour. Durohydroquinone-di-octadecyl ether crystallizes out in white leaflets. It is filtered off after cooling. If the crystals should contain mono-ether, which can easily be tested with silver nitrate, the last step of the procedure may be repeated.

The di-octadecyl ether thus prepared melts at about 96° C. The alcoholic filtrates contain the mono-ether. For its isolation, the solution is evaporated nearly to dryness, and the organic residue then taken up with ether. The ethereal solution is washed with water and Claisen solution (equal parts of 50% aqueous KOH and methanol) to remove unchanged durohydroquinone. The ether solution is distilled and the residue subjected to a distillation under high vacuum. At a pressure of about 0.03 mm. the durohydroquinone mono-octadecyl ether distills rapidly at a bath temperature of 195° C. Before the mono-ether is formed there is a fore-run consisting of yellow duroquinone and octadecyl iodide.

The already fairly pure mono-ether thus derived may then be further purified by recrystallization from alcohol. It consists of white leaflets melting at about 105° C.

According to this procedure, the mono- and the di-ethers are obtained in approximately equal amounts.

2. *Durohydroquinone cetyl ethers*

To a boiling and thoroughly stirred mixture of 8.3 g. of durohydroquinone, 14 g. of dried and powdered potassium carbonate, and 300 cc. of acetone, there is gradually added a mixture of 13 g. of cetyl iodide ($C_{16}H_{33}I$) and 300 cc. of acetone. Refluxing is continued for several hours. Water is then added and the precipitated ethers are filtered. The separation of the di-ether from the mono-ether is then carried out in analogy with Example 1, taking advantage of the relatively great difference of their solubilities in alcohol.

Durohydroquinone-dicetyl ether crystallizes in white leaflets, melting at 89° C.

The mono-cetyl ether, recrystallized from alcohol, melts at 101° C. It distills rapidly at a bath temperature of about 190° C. and about 0.05 mm. pressure.

3. *Durohydroquinone-mono-dihydrochaulmoogryl ether*

8.3 g. of finely pulverized durohydroquinone, 20.4 g. of dihydrochaulmoogryl bromide (prepared by reducing the ethyl ester of dihydrochaulmoogric acid, and brominating the thus obtained alcohol with phosphorous-tribromide in toluol) and 50 cc. of absolute alcohol are heated to 80° C. under constant stirring and the introduction of hydrogen. In the course of 45 minutes, 50 cc. of N alcoholic potash are added dropwise; the temperature is increased to 85° and maintained at this level for an additional five hours under constant stirring. After cooling, the separated material is sucked off, washed with alcohol, stirred into water, again sucked off, thoroughly washed out with water and dried in a desiccator. By repeated recrystallization of this product from acetone, the colorless leaflets of durohydroquinone-bis-dihydrochaulmoogryl ether are obtained, melting at 61° C.

The acetone mother liquors are concentrated in vacuo to dryness, and the residue combined with the alcoholic mother liquor of the di-ether raw product. After adding water, the entire material is completely ethered out. The combined ether extracts are washed with water and repeatedly shaken out with a mixture of equal volumes 50% aqueous potash and methanol in order to remove unchanged durohydroquinone. Finally the ether solution is washed with water, dried, filtered, and evaporated. By distillation in vacuo (at a pressure of 1 mm. Hg the bath temperature being increased to 220° C.) the residue is freed from durohydroquinone and dihydrochaulmoogryl bromide. Thereafter the distillation residue is recrystallized once from acetic ester and several times from methanol, whereby the durohydroquinone-mono-dihydrochaulmoogryl ether is obtained in colorless leaflets melting at 89° C.

Yield, 1.6 g. A single application of 200 mg. of this ether suffices to overcome the absorption sterility of female rats fed with a vitamin E free diet.

The acetyl derivative prepared in the usual manner crystallizes from methanol in colorless leaflets and melts at 60–61° C.

Other ethers of durohydroquinone may be formed in a similar manner, such as the ethers obtained from the alcohols derived from perhydro vitamin A, civetone, or muscone, phytol, nona-decyl alcohol, etc. The ethers, in which R represents $C_{19}H_{37}$ or $C_{19}H_{39}$, have especially valuable therapeutic properties.

4. *Durohydroquinone-mono-dihydrophytol ether*

4.15 g. of finely pulverized durohydroquinone, 12 g. of dihydrophytol bromide, and 50 cc. of absolute alcohol are heated to 80° C. under constant stirring and introduction of hydrogen. In the course of ¼ hour, 25 cc. of N alcoholic potash are added drop-wise. The reaction mixture is stirred for an additional 8 hours at 85–90° C., and after cooling, mixed with 300 cc. of water. The entire mass is shaken out five times with 100 cc. of ether; the combined ether extracts are washed twice with water and repeatedly shaken out with a mixture of equal volumes 50% aqueous potash and methanol in order to remove unchanged durohydroquinone. The ether solution is washed with water, dried and filtered, concentrated, and finally evaporated in vacuo to dryness. The residue is subjected to a fractional distillation in vacuo. The part going over at a pressure of 0.05 mm. Hg at 185–195° C., weighing 4 g., is dissolved in 100 cc. of dry benzol. To the cool benzolic solution cyanic acid vapor is introduced which is obtained by heating 8 g. cyanic acid. After storing the reaction mixture at 0° for four days, the undissolved part is sucked off and washed out well with hot benzol. Filtrate and wash-benzol are evaporated in vacuo to dryness, the residue is recrystallized once from acetone and then from acetic ester. In this manner 2 g. of acid ester allophanate of durohydroquinone-mono-dihydrophytol ester are obtained melting at 182–183° C. The allophanate crystallizes from acetic ester in fine colorless needles which form a stearin-like mass when sucked off and which have the formula $C_{32}H_{56}O_4N_2$.

For the production of the free durohydroquinone-mono-dihydrophytol ether, 2 g. of the allophanate are refluxed for 4 hours in a nitrogen atmosphere with a solution of 2.5 g. potassium hydroxide in 10 g. methanol. After adding 40 cc. of water the substance is thoroughly ethered out; the combined ether solutions are washed with water, dried, filtered, and concentrated. After complete removal of the solvent, 1.6 g. of durohydroquinone-mono-dihydrophytol ether remain as a colorless crystalline mass of a low melting point.

A single administration of 100 mg. of this mono-ether suffices to overcome the absorption sterility of female rats fed with a vitamin E free diet.

The mono-ethers of durohydroquinone possess particular interest because the tocopherols belong to this group. It was, therefore, important to convert these di-ethers (III) which are obtained as a by-product in the processes of the examples, into the more valuable mono-ethers (II), by treating the di-ethers with an agent capable of cleaving them into the mono-ethers.

A number of methods, suggested by investigations of previous inventors, were, therefore, studied and it was found that the cleavage of the di-ethers of durohydroquinone by means of aluminum chloride in a suitable solvent gave most satisfactory results. This reaction may be illustrated by the following formula:

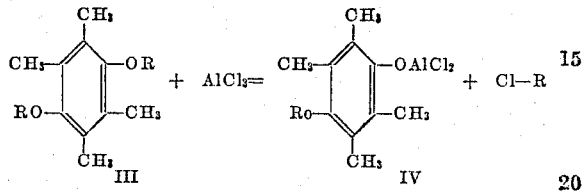

The hypothetical substance (IV) is subsequently hydrolyzed by water to yield the corresponding mono-ether (II).

By this process of the conversion of the intermediate di-ethers to mono-ethers, very good yields of the latter are obtained. It may, therefore, depending upon service conditions, be advisable to direct the alkylation methods described in the examples so as to obtain a relatively high yield of di-ethers, in the first place and then to produce the mono-ether therefrom by the splitting method as described herein.

The reaction is of general application for the ethers of durohydroquinone, and a single example will satisfactorily illustrate the general method as applicable to other ethers of durohydroquinone of the series.

EXAMPLE

To a solution of 36 g. of durohydroquinone di-cetyl ether in 50 cc. of dry benzene, there is added 9 g. of anhydrous aluminum chloride. The mixture is refluxed for about 24 hours. The solution undergoes a series of changes of color, turning from orange over to green to a bluish tint. The benzene solution thus treated is then washed successively with hydrochloric acid, alkali, and water. It is then evaporated. The residue is distilled in a high vacuum. At a pressure of about 0.05 mm. there is obtained a small amount of duroquinone at a bath temperature of 120° C., some cetyl chloride at about 140° C., and the mono-cetyl ether of durohydroquinone distills over at about 190° C. Recrystallized from alcohol, it forms leaflets melting at about 101° C.

I claim:

1. Alkyl mono-ethers of durohydroquinone of the general structure

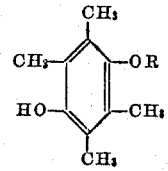

wherein R is a member selected from the group consisting of a higher alkyl radical, a higher alkenyl radical, and an alkyl radical substituted by an alicyclic ring.

2. The higher alkyl mono-ethers of durohydroquinone of the general structure as shown in claim 1, wherein R is a higher alkyl radical.

3. The cetyl mono-ether of durohydroquinone.

4. The nonadecyl mono-ether of durohydroquinone.

5. The nonadecenyl ether of durohydroquinone.

6. The process comprising reacting durohydroquinone with a member selected from the group consisting of a saturated aliphatic alcohol, an unsaturated aliphatic alcohol, an aliphatic alcohol substituted with an alicyclic ring, a higher alkyl halide, a higher alkenyl halide, and an alkyl halide wherein the alkyl radical is substituted by an alicyclic ring.

7. Process according to claim 6, in which the reaction is carried out in an alkaline solution.

8. The process comprising reacting durohydroquinone with a member selected from the group consisting of a saturated aliphatic alcohol, an unsaturated aliphatic alcohol, an aliphatic alcohol substituted with an alicyclic ring, a higher alkyl halide, a higher alkenyl halide, and an alkyl halide wherein the alkyl radical is substituted by an alicyclic ring separating the di-ether from the mono-ether formed by the reaction, reacting the di-ether with an aluminum halide, and recovering the mono-ether.

9. In a process for the production of mono alkyl ethers of durohydroquinone the step comprising splitting di-alkyl ethers of durohydroquinone by means of aluminum chloride.

ERHARD FERNHOLZ.